United States Patent
Chen et al.

(10) Patent No.: US 10,259,970 B2
(45) Date of Patent: Apr. 16, 2019

(54) POLYETHER COMPOUNDS HAVING EPOXY HYDROXYL URETHANE GROUPS AND WATERBORNE EPOXY RESIN COMPOSITION

(71) Applicant: CHANG CHUN PLASTICS CO., LTD., Taipei (TW)

(72) Inventors: Gai-Chi Chen, Taipei (TW); Chia-En Wu, Taipei (TW); An-Pang Tu, Taipei (TW); Kuen-Yuan Hwang, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 210 days.

(21) Appl. No.: 15/487,158

(22) Filed: Apr. 13, 2017

(65) Prior Publication Data
US 2017/0321080 A1    Nov. 9, 2017

(30) Foreign Application Priority Data

May 9, 2016 (TW) .............................. 105114294 A
Oct. 26, 2016 (TW) .............................. 105134507 A

(51) Int. Cl.
| | | |
|---|---|---|
| *C09D 163/00* | (2006.01) | |
| *C08G 65/331* | (2006.01) | |
| *C08G 59/06* | (2006.01) | |
| *C08G 59/22* | (2006.01) | |
| *C08L 63/00* | (2006.01) | |
| *C08G 59/10* | (2006.01) | |

(52) U.S. Cl.
CPC ......... *C09D 163/00* (2013.01); *C08G 59/063* (2013.01); *C08G 59/066* (2013.01); *C08G 59/10* (2013.01); *C08G 59/226* (2013.01); *C08G 65/3318* (2013.01); *C08L 63/00* (2013.01); *C08L 2201/54* (2013.01); *C08L 2205/025* (2013.01)

(58) Field of Classification Search
None
See application file for complete search history.

(56) References Cited

U.S. PATENT DOCUMENTS

2013/0004677 A1* 1/2013 Hwang .................. C08G 71/04
427/512

FOREIGN PATENT DOCUMENTS

CN        104559681 A    *    4/2015

OTHER PUBLICATIONS

Kihara et al., "Synthesis and Properties of Poly(hydroxyurethane)s," Journal of Polymer Science: Part A: Polymer Chemistry, vol. 31(11), pp. 2765-2773 (1993) (Year: 1993).*

* cited by examiner

Primary Examiner — Randy P Gulakowski
Assistant Examiner — Ha S Nguyen
(74) Attorney, Agent, or Firm — Muncy, Geissler, Olds & Lowe, P.C.

(57) ABSTRACT

The present invention is to provide polyether compounds having epoxy hydroxyl urethane group, as the following formula (I), (II) or (III) shows:

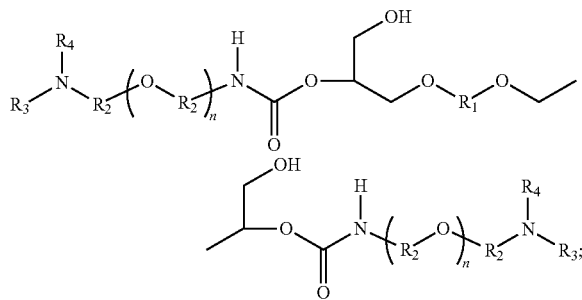

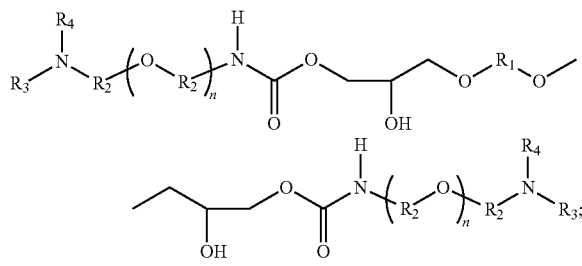

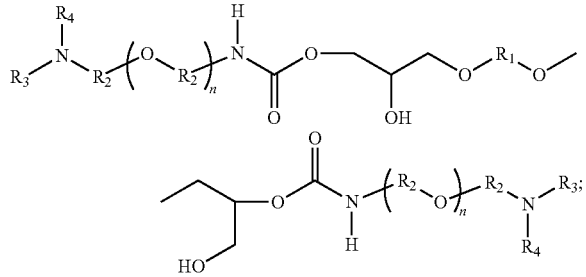

and waterborne epoxy resin composition. Using the hydroxyl urethane as emulsifier, the obtained waterborne epoxy resin composition of the present invention has better stability and freeze-thaw resistance.

12 Claims, No Drawings

POLYETHER COMPOUNDS HAVING EPOXY HYDROXYL URETHANE GROUPS AND WATERBORNE EPOXY RESIN COMPOSITION

BACKGROUND OF THE INVENTION

1. Technical Field

The present invention relates to novel polyether compounds having epoxy hydroxyl urethane groups and waterborne epoxy resin composition.

2. Description of Related Art

A waterborne epoxy resin (WER) is a stable dispersion system wherein the continuous phase is water and the dispersion phase is epoxy resin particles or droplets, and one of its main uses is application in waterborne epoxy paints. Waterborne epoxy paints are similar to solvent-based epoxy resin paints in the way they work. An epoxy resin before applied has a linear structure, and upon its application it undergoes cross-linking reaction and forms a net-like thin film having excellent properties. For this to be achieved, a curing agent has to be added just before the paint is used so as to activate chemical cross-linking reaction of the waterborne epoxy at room temperature. Waterborne epoxy paints have many advantages, such as good adaptability, and high adhesion to many carrier materials. In addition, the cured paint coating has less shrinkage, great hardness, high abrasion resistance, good electrical insulation, high resistance to corrosion and chemicals, superb environmental friendliness, low VOC content making it unlikely to cause air pollution, good operability allowing it to be cured at room temperature and in humid places, reasonable curing time, and ensured cross-linking density. Besides, working with waterborne epoxy paints is convenient because the tools used can be easily cleaned with water.

Epoxy resins are insoluble to water, and only soluble to organic solvents such as aromatic hydrocarbon and ketones. Preparation of a waterborne epoxy resin means making the original solvent-type epoxy become waterborne, and is usually achieved by introducing a hydrophilic molecular chain or a component acting as an emulsifier to the original epoxy resin, so as to allow the epoxy resin to be dissolved or dispersed in water. According to the different water-based way, it can be classified into self-emulsifying waterborne epoxy resins and external-emulsifier emulsified waterborne epoxy resins.

Therein, the method of using an external emulsifier for emulsification involves adding a proper emulsifier, and pulverizing and mixing the epoxy resin, water, and the emulsifier by means of, for example, mechanical stirring, thereby forming an emulsion. This method is easy to operate and requires low costs. However, products so made have poor stability in water and relatively large dispersion phase, while the film foul ing properties thereof are not good enough. Hence, the industry is still in urgent need of a suitable emulsifier that is able to improve epoxy resin emulsions in terms of stability and freeze-thaw resistance.

SUMMARY OF THE INVENTION

To solve the foregoing problem, one primary objective of the present invention is to provide a polyether compound having epoxy hydroxyl urethane group, and has a structural formula (I), (II) or (III):

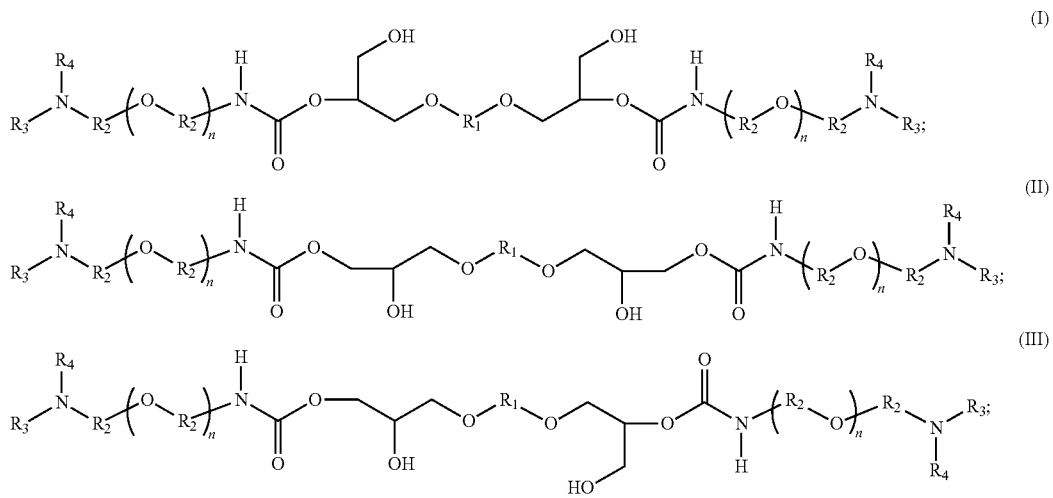

wherein, n is 2~70;
$R_1$ is C4~12 alkyl, alkenyl, alkynyl, cycloalkyl, a polyether group or the structural formula (IV):

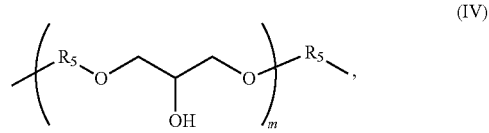

wherein, m is 0~5, and
$R_5$ is one of the structural formulas as below:

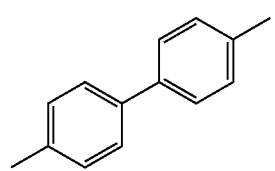

-continued

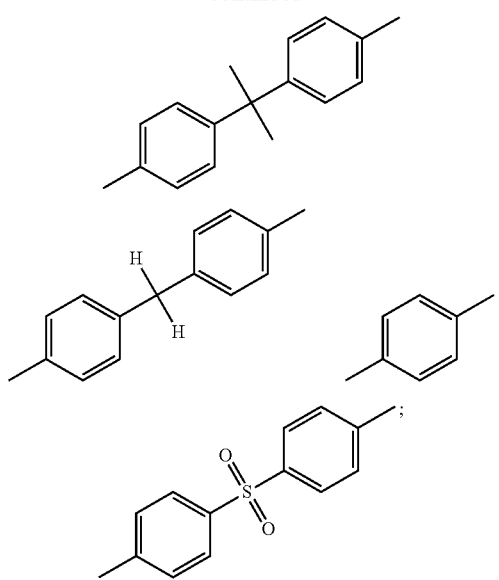

$R_2$ is C2~4 alkyl;
$R_3$ is the structural formula (V) or (VI):

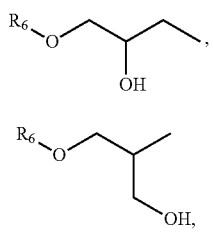

wherein, $R_6$ is C4~12 alkyl, alkenyl, alkynyl, cycloalkyl or a polyether group;
$R_4$ is the structural formula (VII) or (VIII):

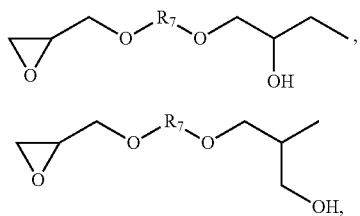

wherein, $R_7$ is C4~12 alkyl, alkenyl, alkynyl, cycloalkyl, a polyether group or the structural formula (IX) as below:

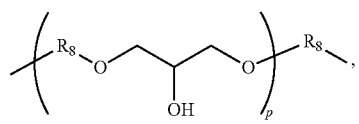

wherein, p is 0~5, and
$R_8$ is one of the structural formulas as below:

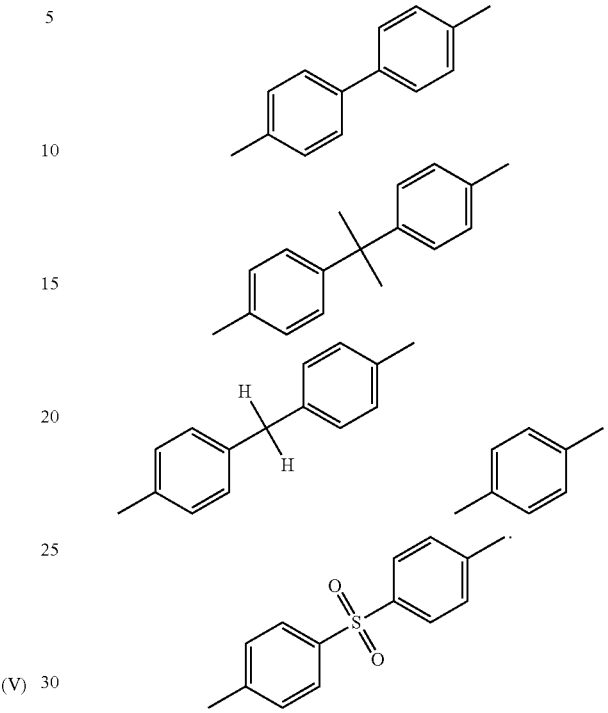

In a preferable embodiment, wherein the polyether compound having epoxy hydroxyl urethane group is an emulsifier of an epoxy resin.

Another primary objective of the present invention is to provide a waterborne epoxy resin composition, which comprises: (a) an epoxy resin, (b) hydroxyl urethane, and (c) water.

In a preferable embodiment, wherein the hydroxyl urethane is a polyether compound having epoxy hydroxyl urethane group. In a more preferable embodiment, it has a structure as defined by Formula (I), (II) or (III) as stated above.

In another preferable embodiment, the hydroxyl urethane having HLB value of 4~17.

In another more preferable embodiment, the hydroxyl urethane having HLB value of 12~15.

In a preferable embodiment, the waterborne epoxy resin composition further comprises a solvent.

In another more preferable embodiment, the epoxy resin is in amount of 30~65 wt % based on the total weight of the waterborne epoxy resin composition; the hydroxyl urethane is in amount of 3~15 wt % based on the total weight of the waterborne epoxy resin composition; the water is in amount of 30~65 wt % based on the total weight of the waterborne epoxy resin composition; the solvent is in amount of 1~20 wt % based on the total weight of the waterborne epoxy resin composition.

In another preferable embodiment, the solvent is any one or more than one selected from the group consisting of alcohols, ethers, and ketones.

In a preferable embodiment, wherein the waterborne epoxy resin composition is used as paint.

Another primary objective of the present invention is to provide a method for making an epoxy resin waterborne, which comprises mixing the epoxy resin and hydroxyl urethane, adding water, and performing emulsification.

In a preferable embodiment, the epoxy resin and hydroxyl urethane are mixed in a solvent.

In a preferable embodiment, mixing is conducted at an elevated temperature, such as 50~80° C.

In another preferable embodiment, water is added at a speed of 2~10 ml/min.

In another preferable embodiment, wherein the hydroxyl urethane polyether compound has a structure as defined by Formula (I), (II) or (III) as stated above.

DETAILED DESCRIPTION OF THE INVENTION

Polyether Compound Having Epoxy Hydroxyl Urethane Group of the Present Invention One primary objective of the present invention is to provide a polyether compound having epoxy hydroxyl urethane group, and has a structural formula (I), (II) or (III) as below:

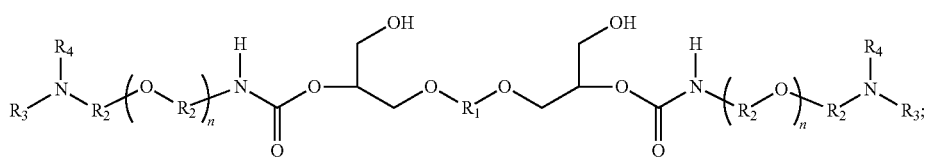
(I)

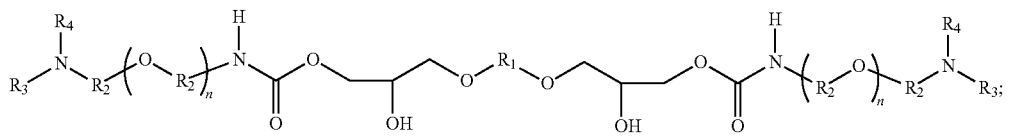
(II)

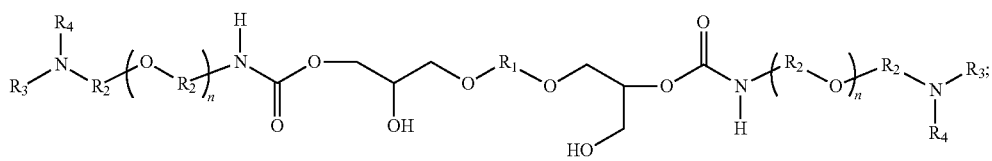
(III)

wherein, n is 2~70;

$R_1$ is C4~12 alkyl, alkenyl, alkynyl, cycloalkyl, a polyether group or the structural formula (IV) as below:

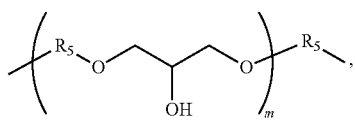
(IV)

wherein, m is 0~5, and $R_5$ is one of the structural formulas as below:

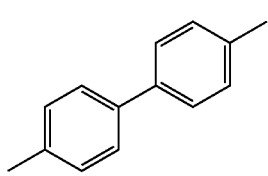

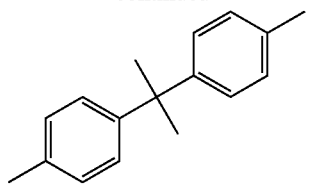

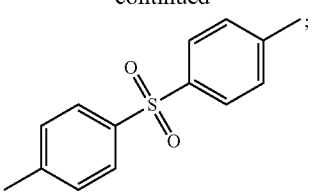

-continued

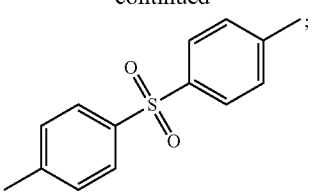

$R_2$ is C2~4 alkyl;

$R_3$ is the structural formula (V) or (VI) as below:

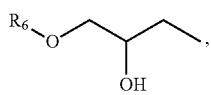
(V)

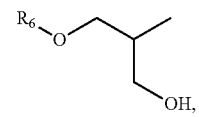
(VI)

wherein, $R_6$ is C4~12 alkyl, alkenyl, alkynyl, cycloalkyl or a polyether group;

$R_4$ is the structural formula (VII) or (VIII) as below:

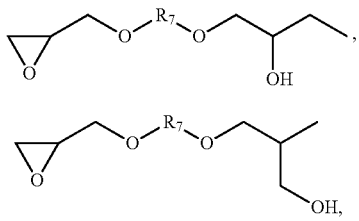

(VII)

(VIII)

wherein, $R_7$ is C4~12 alkyl, alkenyl, alkynyl, cycloalkyl, a polyether group or the structural formula (IX) as below:

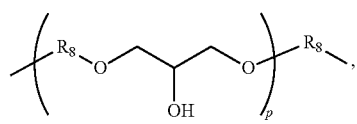

(IX)

wherein, p is 0~5, and
$R_8$ is one of the structural formulas as below:

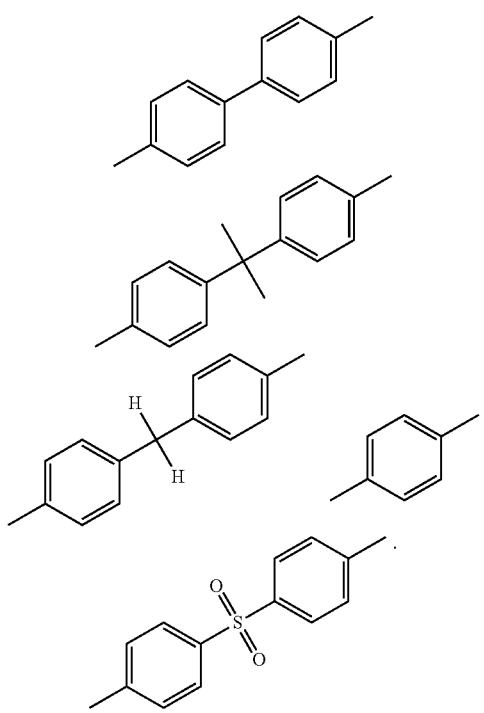

In one aspect, the polyether compound having epoxy hydroxyl urethane group is an improved epoxy functional surfactant. The improved epoxy functional surfactant makes a hydroxyl-urethane-group-containing polyether to react with AGE at 50° C.~90° C., preferably 60~70° C., and more preferably 65° C., for 1~3 hr, and preferably 2 hours before addition of an epoxy resin and heating to 60~120° C., preferably 90~110° C., and more preferably 100° C., for reaction for 1 to 3 hours, and preferably 2 hr, so as to obtain a polyether compound having epoxy hydroxyl urethane group. The reaction can produce compounds of Formulas (I), (II) and (III) of the present invention. The term AGE refers to $C_{12}$~$C_{14}$ alkyl glycidyl ether, which is an epoxy resin have a single functional group.

Waterborne Epoxy Resin Composition of the Present Invention

Another primary objective of the present invention is to provide a waterborne epoxy resin composition, which comprises: (a) an epoxy resin, (b) hydroxyl urethane, and (c) water. For the purpose of this specification, the waterborne epoxy resin composition is also referred to as the epoxy resin emulsion.

The epoxy resin used in the present invention may be conventional epoxy resins. Examples thereof include glycidyl ether epoxy resins, glycidyl ester epoxy resins, glycidyl amine epoxy resins, linear aliphatic epoxy resins, alicyclic epoxy resins, epoxy resins obtained from bisphenol A, bisphenol F or bisphenol sulfone, phenol phenolic novolac resins, polyepoxy propyl ethers of cresol novolac resins, polyepoxy propyl ether of oxyalkylene adducts of bisphenol A, poly propylene glycol, 1,6-hexanediol, trimethylol propane, polyepoxy propyl ethers of polyvalent alcohols such as glycerol, adipic acid, phthalic acid, polyepoxy propyl ester of poly carboxylic acids such as dimeric acid, and polyepoxy propyl amine. Other epoxy resins also comprise glycidyl ether, and may be prepared by making epichlorohydrin react with a compound having at least 1.5 aromatic hydroxyl groups under alkaline conditions. In addition to the foregoing epoxy resins, other epoxy resins suitable for the present invention are single epoxy resins, diglycidyl ethers of dihydroxyl compounds, epoxy phenolic, alicyclic epoxy resins, polyglycidyl esters of polycarboxylic acids, acrylic resins containing glycidyl methacrylate, and combinations thereof. Moreover, modified epoxy resins made by modifying the epoxy resins with polyphenols such as bisphenol A or bisphenol F, or poly carboxylic acid such as adipic acid or decanedioic acid are also usable. Among these, the epoxy resins obtained from epichlorohydrin and a phenol compound containing two hydroxyl groups, and particularly, the epoxy resins obtained from bisphenol A or bisphenol F and epichlorohydrin, are more usable in the present invention. These epoxy resins preferably each have an epoxy equivalent weight of 100 to 700 g/eq, such as 125-130 g/eq, 170-180 g/eq, 490-500 g/eq, and 275-290 g/eq.

In the present invention, the term "HLB value" refers to the hydrophilic lipophilic balance value, which indicates the degree to which a surfactant is hydrophilic or lipophilic. The higher the HLB value is, the more hydrophile the surfactant is. The smaller the HLB value is, the more lipophilic the surfactant is. The value may be determined using an empirical formula of $HLB = 7 + 11.7 \log M_W/M_O$, where $M_W$ and $M_O$ are respectively the molecular weights of the hydrophilic group and the lipophilic group in the surfactant. The HLB value may be alternatively estimated using the water dissolution method, which involves adding the test subject to water and determining its HLB value according to the observed appearance of the resulting dispersion according to the scale shown in Table 1:

TABLE 1

| Estimation of HLB values | Test subject in water |
|---|---|
| 1~4 | Not dispersed at all |
| 3~6 | Not well dispersed |

TABLE 1-continued

| Estimation of HLB values | Test subject in water |
|---|---|
| 6~8 | Forming emulsive dispersion after strong agitation |
| 8~10 | Forming stable milky dispersion |
| 10~13 | Forming translucent to transparent dispersion |
| >13 | Forming clear solution |

In one preferred embodiment, the disclosed hydroxyl urethane is a polyether compound having epoxy hydroxyl urethane group, and is the Structural Formula (I), (II) or (III) as defined previously. In another preferred embodiment, the HLB value of the disclosed hydroxyl urethane is estimated using the water dissolution method. For an emulsifier of a waterborne epoxy resin composition, an excessively large or small HLB value cannot achieve preferred emulsifation. The HLB value of the disclosed hydroxyl urethane may be adjusted using the content of hydrophilic ethylene oxide (EO) in the starting material, polyether amine. Where the identical polyether amine is used, the adjustment may be accomplished by controlling its [CCV]/[NH$_2$] mole ratio. For example, the [CC]/[NH$_2$] mole ratio may be controlled at 0.5~0.75, such as 0.5, 0.6, 0.66, 0.7 or 0.75. According to experiments, hydroxyl urethane having HLB value of 4~17, and epoxy resin emulsion stability of 6~16, or more preferably 12~15, is able to endow the resulting waterborne epoxy resin composition with desired stability and freeze-thaw resistance.

In one preferred embodiment of the present invention, the waterborne epoxy resin composition may further comprise a solvent if necessary. Herein, the term "solvent" refers to a substance that adjusts the softening point of the epoxy resin. Therefore, people skilled in the art may add the solvent in an appropriate amount according to the properties of the epoxy resin used. While insufficient addition may lead to failure in adjusting the resin's softening point, excessive addition may cause undesirable increase of volatile organic compounds (VOCs) in the waterborne epoxy resin. Therefore, the using amount of the solvent is preferably 1~20 wt %, more preferably 3~10 wt %, and most preferably 3~7 wt % of the total amount of the waterborne epoxy resin composition. Of course, if the epoxy resin has a proper softening point, the addition of a solvent may be omitted.

Solvents usable in the present invention may be any solvents that can uniformly disperse the epoxy resin and hydroxyl urethane, and are inert to them, without limitation. Examples include esters such as ethyl acetate, 3-methoxybutyl acetate, methoxypropyl acetate, and cellosolve acetate; alcohols such as methanol, ethanol, and isopropanol; cellosolves such as methyl cellosolve, ethyl cellosolve, propyl cellosolve, butyl cellosolve, isobutyl cellosolve, and tert-butyl cellosolve; glymes such as monoethylene glycol dimethyl ether, diglyme, and triglyme; propylene glycol monoalkyl ethers such as propylene glycol monomehtyl ether, propylene glycol monoehtyl ether, propylene glycol monobutyl ether, propylene glycol monoisobutyl ether, and propylene glycol monotertbutyl ether; and ketones such as acetone, and methyl ethyl ketone, among which propylene glycol monoalkyl ethers are most preferable, such as propylene glycol methyl ether.

In another more preferred example, the epoxy resin is in amount of 30~65 wt %, preferably 40~60 wt %, and more preferably 45~55 wt %, based on the total weight of the waterborne epoxy resin composition.

In a more preferred example, the hydroxyl urethane is in amount of 3~15 wt %, preferably 3~7 wt %, and more preferably 5~7 wt %, based on the total weight of the waterborne epoxy resin composition.

In a more preferred example, the water is in amount of 30~65 wt %, preferably 40~60 wt %, and more preferably 45~50 wt %, based on the total weight of the waterborne epoxy resin composition.

To the disclosed waterborne epoxy resin composition, other resins, such as ester waterborne resins or acrylic waterborne resin may be incorporated as needed provided that the incorporation brings no adverse impact on the properties of the resulting waterborne epoxy resin. Furthermore, in the disclosed waterborne epoxy resin composition, various additives may be considered according to practical needs, such as anti-cissing agents, anti-sagging agents, flow-leveling agents, defoamants, curing aid agents, UV absorbers, and photostabilizers. The use of the disclosed waterborne epoxy resin composition is not limited herein, and may include, for example, paints, adhesives, fiber gathering agents, and concrete primers.

The waterborne epoxy resin of the present invention may be extensively used in waterborne paints for indoor and outdoor applications, waterborne paints for inorganic building materials, waterborne anticorrosive paints for iron parts, and waterborne paints for car repair, and may be also used for industrial applications such as automotive painting and beverage cans. Among the foregoing applications, with its excellent anticorrosive properties and dry feeling by finger touch, it is suitable for anticorrosive waterborne paints applied to iron parts of steel structures or bridges for multilayer anticorrosive purposes, and particularly suitable for anticorrosive waterborne paints applied to iron parts as a primer.

Where the disclosed waterborne epoxy resin composition is used in a paint, various dyes or various additives such as anticorrosive colors, coloring agents, and extenders are preferably incorporated as needed. Examples of the anticorrosive colors include scale-like colors, such as zinc powder, aluminium phosphomolybdate, zinc phosphate, aluminum phosphate, barium chromate, aluminum chromate, and graphite. Example of the coloring agents includes carbon black, titanium oxide, zinc sulfide, and red iron oxide. Example of the extenders includes barium sulfate, calcium carbonate, talcum, and kaolin.

Where the disclosed waterborne epoxy resin composition is used as a paint, the applied way is not limited, and may include roller coating, spraying, brushing, blade applying, using a rod coater, dipping coating, and electrodeposition coating. Post-coating processing may be air drying, and then thermal curing. For thermal curing, the temperature is preferably 50 to 250° C., and more preferably 60 to 230° C., and the heating time is preferably 2 to 30 minutes, and more preferably 5 to 20 minutes.

Where the disclosed waterborne epoxy resin composition is used as an adhesive, the way how it is used is not limited herein. The waterborne epoxy resin composition may be applied to the adhesive surface of a substrate by means of spraying, brushing, or blade applying. After the joint is peripherally fixed or pressed, a strong adhesive layer can be formed. For this purpose, suitable substrate may include steel sheets, concrete, mortar, wood, resin laminates, and resin thin films, and may preciously receive physical processing such as polishing, electrical processing such as corona treatment, and chemical processing such as chemical conversion treatment for easy coating.

Method for Making the Waterborne Epoxy Resin

Another objective of the present invention is to provide a method for making an epoxy resin waterborne, which comprises mixing the epoxy resin and hydroxyl urethane, adding water, and performing emulsification.

In one preferred embodiment, the epoxy resin and hydroxyl urethane are first mixed in a solvent before water is added and emulsification is performed.

In the method for making the epoxy resin waterborne, hydroxyl urethane is an emulsifier used in an aqueous dispersion of the epoxy resin. The good properties of the waterborne epoxy resin emulsion as observed include desired resin emulsion stability and resin emulsion freeze-thaw resistance.

In one preferred embodiment, mixing is conducted at an elevated temperature, such as 50~80° C., and preferably mixing is conducted at 60~80° C.

In another preferred embodiment, water is added at a speed of 2~10 ml/min. While a speed slower than 2 ml/min can make emulsification unnecessarily prolonged, a speed faster than 10 ml/min may lead to poor emulsification.

In another preferred embodiment, the hydroxyl urethane is a polyether compound having epoxy hydroxyl urethane group, and has a structure as defined by Formula (I), (II) or (III) as stated above.

The preparation examples and examples described below are intended to illustrate the principles of present invention but not to limit the scope of the present invention. Materials used in the following preparation examples and examples have the following definitions:

BDGE125: poly(glycidyl ether) of 1,4-butanediol, with an epoxy equivalent weight of 125 to 130 g/eq, produced by ChangChun Plastics Co. Ltd.

BE180: poly(glycidyl ether) of bisphenol A, with an epoxy equivalent weight of 170 to 180 g/eq, produced by ChangChun Plastics Co. Ltd.

BE501: poly(glycidyl ether) of bisphenol A, with an epoxy equivalent weight of 490 to 500 g/eq, produced by ChangChun Plastics Co. Ltd.

AGE: C12~C14 alkyl glycidyl ether, with an epoxy equivalent weight of 275 to 290 g/eq, produced by ChangChun Plastics Co. Ltd.

Jeffamine D230: produced by Huntsman.

Jeffamine D400: produced by Huntsman.

Jeffamine D2000: produced by Huntsman.

Jeffamine ED2003: produced by Huntsman.

Preparation Examples

Preparation Example 1-1: Synthesis of BDGE125 Cyclic Carbonate 100 g of BDGE125 epoxy resin, and 0.1~5% of quaternary ammonium salt were placed in a reactor, stirred and heated to 150° C. $CO_2$ was introduced and reaction was performed under 5 $kg/cm^2$ for 4 hr, thereby obtaining BDGE125 cyclic carbonate. By calculating the consumption of $CO_2$, the conversion was determined as 95%.

Preparation Example 1-2: Synthesis of BE180 Cyclic Carbonate 100 g of BE180 epoxy resin, and 0.1~5% of quaternary ammonium salt were placed in a reactor, stirred and heated to 150° C. $CO_2$ was introduced and reaction was performed under 5 $kg/cm^2$ for 4 hr, thereby obtaining BE180 cyclic carbonate. By calculating the consumption of $CO_2$, the conversion was determined as 93%.

Preparation Example 2: Synthesis of Hydroxyl Urethane Polyether

BDGE125 cyclic carbonate of Preparation Example 1~1 and BE180 cyclic carbonate of Preparation Example 1~2 were respectively put into reaction with the polyether amines of different types shown in Table 2 as below at 160° C. for 7 hr, thereby obtaining hydroxyl urethane polyethers. The experimental formulas are shown in Table 2 as below:

TABLE 2

| | | Sample No. | | | | | | | | | | | |
|---|---|---|---|---|---|---|---|---|---|---|---|---|---|
| | | S1 | S2 | S3 | S4 | S5 | S6 | S7 | S8 | S9 | S10 | S11 | S12 |
| [CC]/[$NH_2$] | | 0.5 | 0.5 | 0.5 | 0.5 | 0.5 | 0.5 | 0.5 | 0.5 | 0.66 | 0.75 | 0.66 | 0.75 |
| BDGE cyclic carbonate | g | 100.00 | 100.00 | 100.00 | 100.00 | | | | | 100.00 | 100.00 | | |
| BE180 cyclic carbonate | g | | | | | 100.00 | 100.00 | 100.00 | 100.00 | | | 100.00 | 100.00 |
| Jeffamine D230 | g | 165.37 | | | | 107.78 | | | | | | | |
| Jeffamine D400 | g | | 317.95 | | | | 206.57 | | | | | | |
| Jeffamine D2000 | g | | | 1416.67 | | | | 923.30 | | | | | |
| Jeffamine ED2003 | g | | | | 1584.78 | | | | 1032.87 | 1200.60 | 1056.52 | 782.48 | 688.58 |

Note:
[CC]/[$NH_2$] is the mole ratio of cyclic carbonate group/amine group.

Preparation Example 3: Synthesis of Hydroxyl Urethane Polyether Having Epoxy Functional Groups The hydroxyl urethane polyethers of Sample No. S01~S12 as synthesized previously were put into reaction with a certain amount of AGE at 65° C. for 2 hr. BE180 epoxy resin was added and the mixture was heated to 100° C. for reaction for 2 hr, thereby obtaining hydroxyl urethane polyethers having epoxy functional groups (Sample No. S13~524, wherein S13~S18 correspond to the compounds of Formulas (I), (II) and (III) of the present invention, $R_1$ is a butane group; $R_2$ is ethane and a propane group; $R_3$ is a group derived from AGE, $R_4$ is a group derived from BE180; S19~S24 correspond to the compounds of Formulas (I), (II) and (III) of the present invention, $R_1$ is a group derived from BE180; $R_2$ is ethane and a propane group; $R_3$ is a group derived from AGE, $R_4$ is a group derived from BE180). The experimental formulas are shown in Tables 3 and 4 as below. The HLB values were estimated using the water dissolution method.

freezer, and set at the atmospheric temperature for 7 hr. The test was repeated for 5 times. Observation was conducted to determine whether emulsion was settling, gelation or coagulation.

TABLE 3

Hydroxyl urethane polyethers with BDGE epoxy functional groups

| | | Sample No. | | | | | |
|---|---|---|---|---|---|---|---|
| | | S13 | S14 | S15 | S16 | S17 | S18 |
| [epoxy]/[AHEW] | g | 1.1 | 1.1 | 1.1 | 1.1 | 1.1 | 1.1 |
| S01 | g | 100.00 | | | | | |
| S02 | g | | 100.00 | | | | |
| S03 | g | | | 100.00 | | | |
| S04 | g | | | | 100.00 | | |
| S09 | g | | | | | 100.00 | |
| S10 | g | | | | | | 100.00 |
| AGE | g | 99.24 | 58.25 | 14.57 | 13.07 | 8.63 | 5.85 |
| BE180 | g | 63.35 | 37.18 | 9.30 | 8.35 | 5.51 | 4.11 |
| HLB value | g | 8 | 6 | 2 | 15 | 17 | Gelation Unanalyzable |

TABLE 4

Hydroxyl urethane polyether with BE180 epoxy functional groups

| | | Sample No. | | | | | |
|---|---|---|---|---|---|---|---|
| | | S19 | S20 | S21 | S22 | S23 | S24 |
| [epoxy]/[AHEW] | | 1.1 | 1.1 | 1.1 | 1.1 | 1.1 | 1.1 |
| S05 | g | 100.00 | | | | | |
| S06 | g | | 100.00 | | | | |
| S07 | g | | | 100.00 | | | |
| S08 | g | | | | 100.00 | | |
| S11 | g | | | | | 100.00 | |
| S12 | g | | | | | | 100.00 |
| AGE | g | 88.29 | 54.29 | 14.31 | 12.86 | 8.45 | 5.72 |
| BE180 | g | 56.36 | 34.66 | 9.14 | 8.21 | 5.39 | 4.01 |
| HLB Value | g | 6 | 4 | 1 | 12 | 14 | Gelation Unanalyzable |

Note 1: [ANEW] is amine hydrogen equivalent weight.
Note 2: "Gelation: shown in the field of the HLB value indicates that the molecular weight of the product during reaction was so high that gelation appeared.

EXAMPLES

Experiments about making epoxy resins waterborne were conducted using hydroxyl urethane polyethers having epoxy functional groups:

BE501 epoxy resin, a hydroxyl urethane polyether having epoxy functional groups (Sample No. S13~S24) as the emulsifier, propylene glycol methyl ether as the solvent, and AGE as the thinner for adjusting the viscosity of the system were placed into a 100 ml glass reactor at a certain proportion. The reactor was heated to 70° C., and the components were stirred and mixed. Pure water of a certain proportion was added at a speed of 2~10 ml/min for emulsification, thereby obtaining a waterborne epoxy resin composition (Sample No. S25~S36).

The waterborne epoxy resin compositions were obtained, and tested for emulsion stability using the centrifugal sedimentation method. The test was conducted with the centrifugal force=1600 G*5 min. The levels of stability were compared.

The waterborne epoxy resin compositions were obtained, and placed in a −18° C. freezer for 17 hr, removed from the The results of the experiments are shown in Table 5 as below:

| | | Sample | | | | | | |
|---|---|---|---|---|---|---|---|---|
| | | S25 | S26 | S27 | S28 | S29 | S30 | S31 |
| BE501 | g | 43 | 43 | 43 | 43 | 43 | 35 | 55 |
| S13 | g | 5 | | | | | | |
| S14 | g | | 5 | | | | | |
| S15 | g | | | 5 | | | | |
| S16 | g | | | | 5 | | 3 | 7 |
| S17 | g | | | | | 5 | | |
| Propylene Glycol Methyl Ether | g | 5 | 5 | 5 | 5 | 5 | 7 | 1 |
| AGE | g | 5 | 5 | 5 | 5 | 5 | 5 | 5 |
| Pure Water | g | 42 | 42 | 42 | 42 | 42 | 50 | 30 |
| Emulsion Stability | | OK | OK | NG | OK | OK | OK | OK |
| Emulsion Freeze-Thaw Resistance | | Δ | Δ | X | ○ | X | Δ | ○ |

-continued

| | | Sample | | | | |
|---|---|---|---|---|---|---|
| | | S32 | S33 | S34 | S35 | S36 |
| BE501 | g | 43 | 43 | 43 | 43 | 43 |
| S19 | g | 5 | | | | |
| S20 | g | | 5 | | | |
| S21 | g | | | 5 | | |
| S22 | g | | | | 5 | |
| S23 | g | | | | | 5 |
| Propylene Glycol Methyl Ether | g | 5 | 5 | 5 | 5 | 5 |
| AGE | g | 5 | 5 | 5 | 5 | 5 |
| Pure Water | g | 42 | 42 | 42 | 42 | 42 |
| Emulsion Stability | | OK | OK | NG | OK | OK |
| Emulsion Freeze-Thaw Resistance | | Δ | Δ | X | ○ | ○ |

Note 1:
Emulsion stability is determined by whether the emulsion was layered or showed resin coagulating. Where the emulsion was not layered and showed no resin coagulating, OK was recorded; otherwise, NG was recorded.

Note 2:
○: the emulsion remained unchanged after five times of freeze-thaw cycles; Δ: the emulsion remained unchanged after three times of freeze-thaw cycles; X: the emulsion was layered or showed resin gathering after a single freeze-thaw cycle.

According to the above results, when the hydroxyl urethane is used as an emulsifier, the epoxy resin composition can be waterborned. When the hydroxyl urethane has its HLB of 4~17, an epoxy resin emulsion with desired stability can be obtained. When the hydroxyl urethane has its HLB of 12~15, an epoxy resin emulsion with good stability and freeze-thaw resistance can be obtained.

The waterborne epoxy resin composition of the present invention contains hydroxyl urethane as the emulsifier, so that it can be waterborned, and further obtained the epoxy resin emulsion having preferred stability and freeze-thaw resistance.

What is claimed is:

1. A waterborne epoxy resin composition, comprising: (a) an epoxy resin, (b) hydroxyl urethane, and (c) water, wherein the hydroxyl urethane is a polyether compound having epoxy hydroxyl urethane group, and has a structural formula (I), (II) or (III):

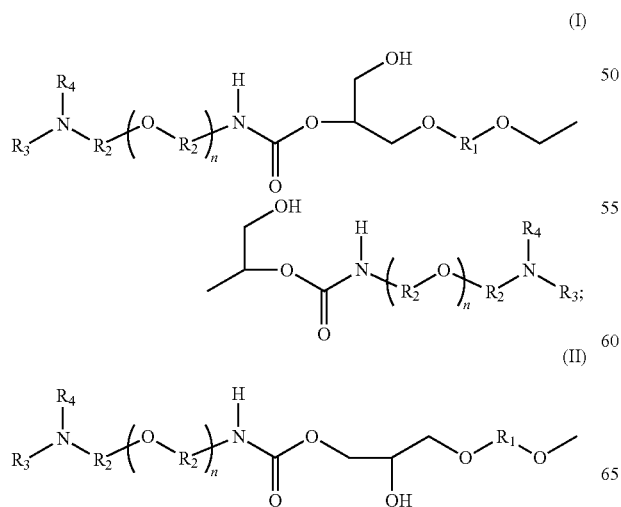

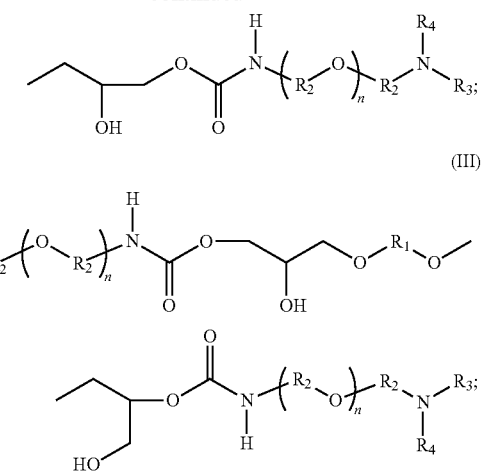

wherein, n is 2~70;

$R_1$ is C4~12 alkyl, alkenyl, alkynyl, cycloalkyl, a polyether group or the structural formula (IV) as below:

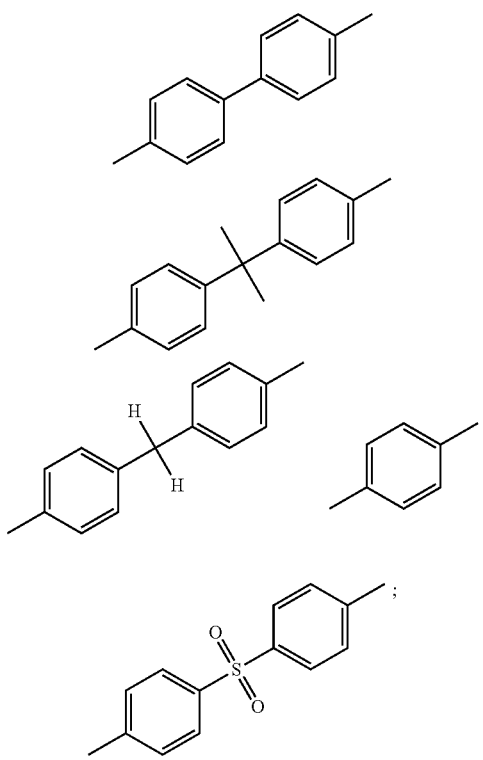

wherein, m is 0~5, and $R_5$ is one of the structural formulas as below:

R₂ is C2~4 alkyl;
R₃ is the structural formula (V) or (VI) as below:

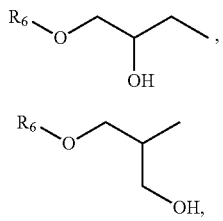

(V)

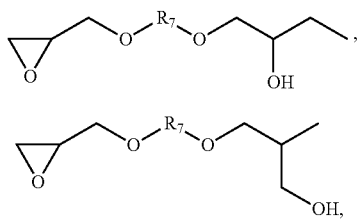

(VI)

wherein, R₆ is C4~12 alkyl, alkenyl, alkynyl, cycloalkyl or a polyether group;
R₄ is the structural formula (VII) or (VIII) as below:

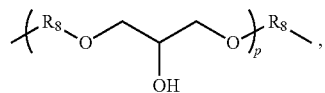

(VII)

(VIII)

wherein, R₇ is C4~12 alkyl, alkenyl, alkynyl, cycloalkyl, a polyether group or the structural formula (IX) as below:

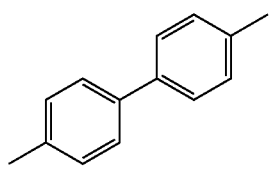

(IX)

wherein, p is 0~5, and
R₈ is one of the structural formulas as below:

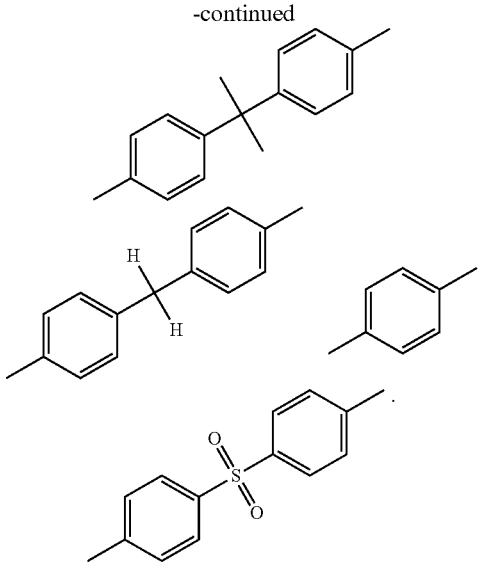

2. The waterborne epoxy resin composition of claim 1, wherein the hydroxyl urethane having its HLB value of 4~17.

3. The waterborne epoxy resin composition of claim 2, wherein the hydroxyl urethane having HLB value of 12~15.

4. The waterborne epoxy resin composition of claim 1, which further comprises a solvent.

5. The waterborne epoxy resin composition of claim 1, wherein the epoxy resin is in amount of 30~65 wt % based on the total weight of the waterborne epoxy resin composition.

6. The waterborne epoxy resin composition of claim 1, wherein the hydroxyl urethane is in amount of 3~15 wt % based on the total weight of the waterborne epoxy resin composition.

7. The waterborne epoxy resin composition of claim 1, wherein the water is in amount of 30~65 wt % based on the total weight of the waterborne epoxy resin composition.

8. The waterborne epoxy resin composition of claim 4, wherein the solvent is in amount of 1~20 wt % based on the total weight of the waterborne epoxy resin composition.

9. The waterborne epoxy resin composition of claim 4, wherein the solvent is any one or more than one selected from the group consisting of alcohols, ethers, and ketones.

10. The waterborne epoxy resin composition of claim 1, which is used as paint.

11. A polyether compound having epoxy hydroxyl urethane group, which has a structural formula (I), (II) or (III):

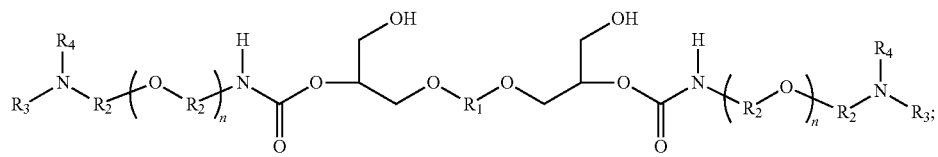

(I)

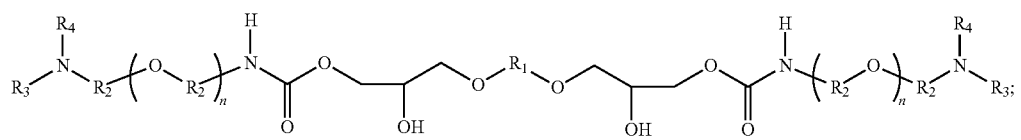

(II)

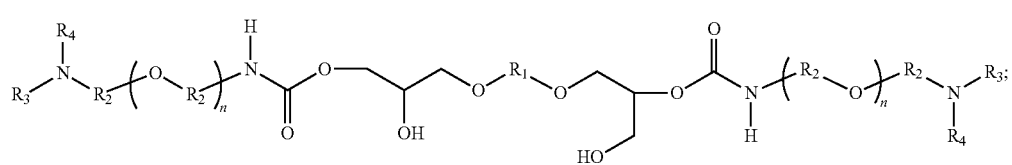

wherein, n is 2~70;
R₁ is C4~12 alkyl, alkenyl, alkynyl, cycloalkyl, a polyether group or the structural formula (IV) as below:

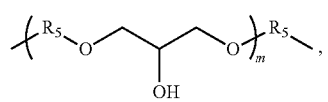

wherein, m is 0~5, and
R₅ is one of the structural formulas as below:

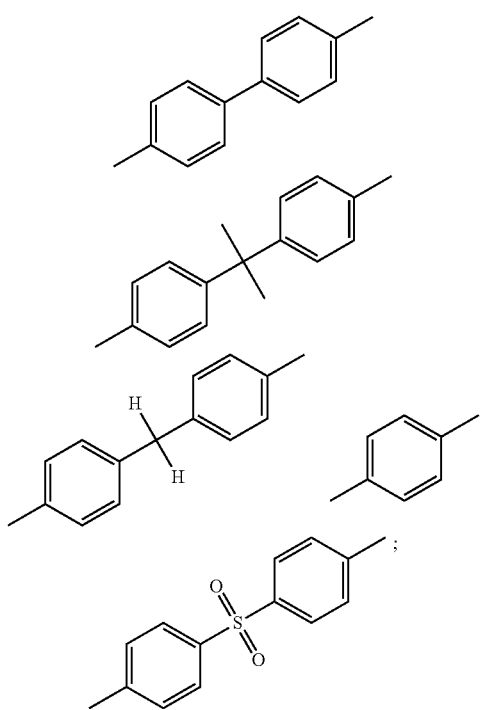

R₂ is C2~4 alkyl;
R₃ is the structural formula (V) or (VI):

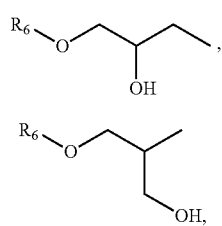

wherein, R₆ is C4~12 alkyl, alkenyl, alkynyl, cycloalkyl or a polyether group;
R₄ is the structural formula (VII) or (VIII):

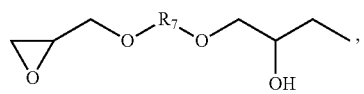

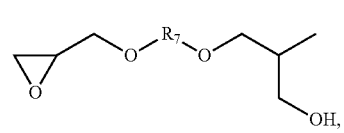

wherein, R₇ is C4~12 alkyl, alkenyl, alkynyl, cycloalkyl, a polyether group or the structural formula (IX):

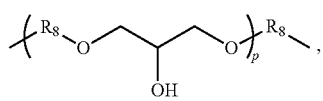

wherein, p is 0~5, and
R₈ is one of the structural formulas as below:

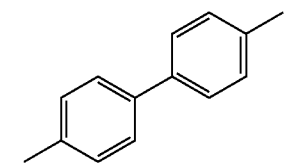
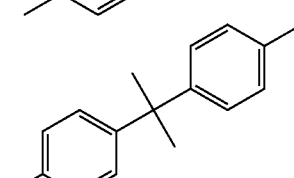
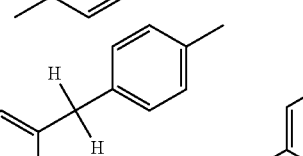
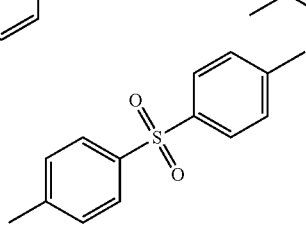

12. The polyether compound having epoxy hydroxyl urethane group of claim 11, which is an emulsifier of an epoxy resin.

* * * * *